United States Patent

Dunseath

[15] 3,700,063
[45] Oct. 24, 1972

[54] FUEL LOCK

[72] Inventor: Edward Dunseath, 51 Jefferson Blvd., Port Jefferson Station, N.Y. 11766

[22] Filed: Nov. 16, 1970

[21] Appl. No.: 89,707

[52] U.S. Cl. ............. 180/114, 70/179, 70/220, 70/207, 70/298, 137/384.4
[51] Int. Cl. ............................................. B60r 25/00
[58] Field of Search ............... 180/114; 137/385, 137/384.4, 552.5; 70/298, 243, 220, 287, 288, 179, 207, 175, 176, 242

[56] References Cited

UNITED STATES PATENTS

| 685,135 | 10/1901 | Hart | 70/298 X |
|---|---|---|---|
| 937,286 | 10/1909 | Groswell | 70/298 |
| 1,025,105 | 4/1912 | Youngs | 180/114 X |
| 1,040,913 | 10/1912 | Falke | 137/384.4 |
| 1,312,376 | 8/1919 | Williams | 70/243 X |
| 1,336,650 | 4/1920 | Nickerson | 137/384.4 |
| 1,726,530 | 9/1929 | Gillen | 180/114 UX |
| 2,766,607 | 10/1956 | Kremer | 180/114 UX |
| 2,881,789 | 4/1959 | Finazzo | 180/114 X |

FOREIGN PATENTS OR APPLICATIONS

| 28,259 | 10/1908 | Sweden | 70/298 |
|---|---|---|---|

*Primary Examiner*—Robert J. Spar

[57] ABSTRACT

An anti-theft device for an automotive vehicle, the device comprising a gasoline shut off valve; the valve not preventing the engine from being started, but being able to cause the engine to come to a stop when the gasoline supply in the carburator is used up.

2 Claims, 6 Drawing Figures

PATENTED OCT 24 1972         3,700,063
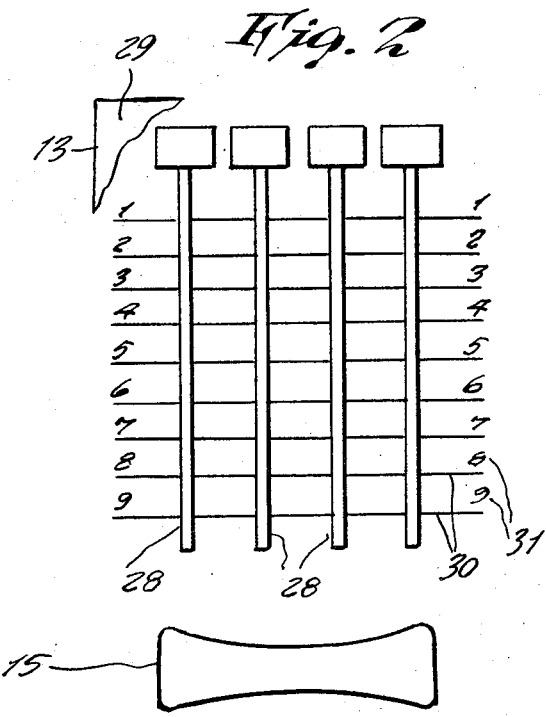
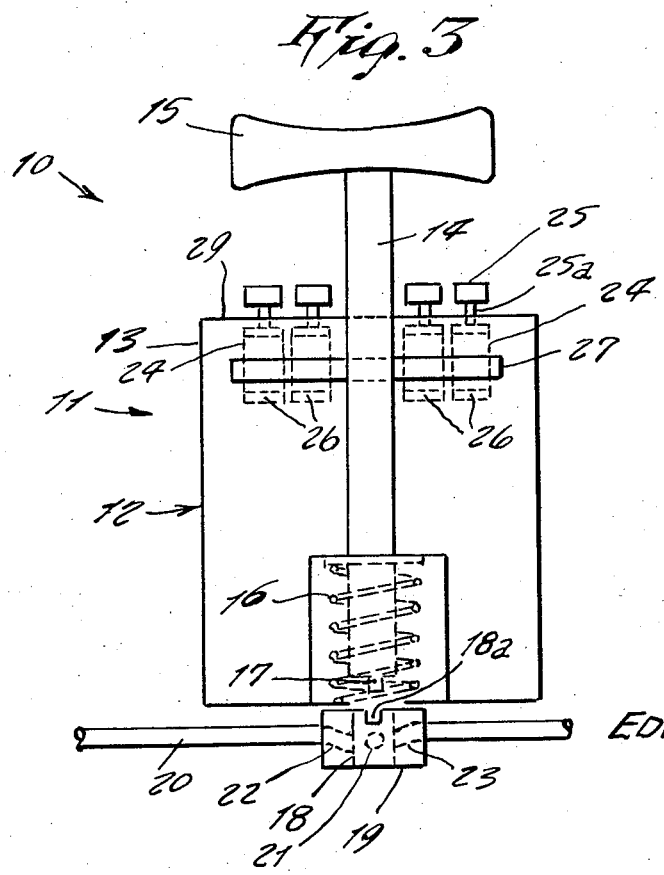
INVENTOR
EDWARD DUNSEATH

FUEL LOCK

This invention relates generally to anti-theft devices for automotive vehicles.

A principal object of the present invention is to provide a vehicle anti-theft device that incorporates a novel method for preventing a car theft by shutting off a continuation of a fuel supply to the vehicle engine so that a get-away of the stolen vehicle is impossible to accomplish by the thief.

Another object is to provide a vehicle anti-theft device which comprises a valve that normally does not interfere with the normal operation of the vehicle, but which when present will close off the fuel supply line to the engine carburetor, so to cease the engine operation and thus halt the vehicle.

Other objects are to provide a vehicle anti-theft device which is simple in design, inexpensive to manufacture, rugged in construction, easy to use and efficient in operation.

These and other objects will be readily evident upon a study of the following specification and the accompanying drawing wherein:

FIGS. 1a, 1b, 1c, and 1d are side views of the slides of the invention, with staggered openings.

FIG. 2 is a top view and shown including the handle.

FIG. 3 is an end elevation view of the assembled invention.

Referring now to the drawing in detail, the reference numeral 10 represents a vehicle anti-theft device according to the present invention wherein there is a fuel-lock 11.

The fuel-lock 11 includes a unit 12 that can be conveniently mounted on a dashboard or floorboard of the vehicle. The unit 12 includes a housing case 13 from which a slidable plunger 14 extends outwardly and which at its outer end has a cross handle 15 secured thereto for manual operation. A compression coil spring 16 inside the case normally urges the plunger in outwardly slided position so that an oblong shaped key pin 17 on the opposite end of the plunger is disengaged from a slot 18a in a rotatable cylinder 18 within a gasoline valve 19 that intercepts a gasoline line 20 running from a fuel supply to the vehicle carburetor.

An important feature of the present invention is a means that permits or prevents the plunger key pin to turn the cylinder 18 and thus either align or disalign a transverse opening 21 through the cylinder with the openings 22 and 23 of the valve 19 to which the gasoline line ends are connected. This comprises a series of slides 24 within the case, each slide having an externally extending knob 25 from the case for manual control. Each slide has an opening 26; the opening 26 being located along different positions on each of the slides, so that it is not readily apparent to any unauthorized person, to what positions the slides can be slided so to align all of the openings 26. The plunger 14 has a transverse extending pin 27 secured therethrough which prevents the plunger to be moved when the bodies of the slides are in the way of the pin 27. However, when the openings 26 are all aligned along the path of travel of the pin 27, the pin 27 is unobstructed, and the plunger can be moved so that the key pin 17 can rotate the cylinder 18.

Each of the knobs 25 are mounted on knob posts 25a that extend through slots 28 on the wall 29 of the case; each slot 28 being calibrated into divisions 30 designated by numerals 31, so that a driver can readily move the knobs to positions known only to him so that he can clear the passage for the plunger pin 27 thus allowing him to turn on the gasoline supply. However, when he leaves the vehicle, he will scramble the positions of the knobs 25 so that an unauthorized person such as a thief cannot properly align them, and is thus unable to rotate the cylinder 18 into an operative position, if the driver has turned it into a closed position before he scrambled the knob positions.

Thus a novel vehicle anti-theft device is provided.

While various changes may be made in the detail construction, it is to be understood that such changes will be within the spirit and scope of the present invention.

I claim:

1. A vehicular fuel lock for controlling the flow of fuel in the supply line to the carburetor, of an internal combustion engine, comprising a valve mounted in the supply line in combination with a valve actuating device mounted in the vehicle adjacent said valve and having a valve actuator movable from a position spaced from said valve to a position engaging said valve, including coacting means on said valve and actuator whereby said actuator can move the valve from a closed to open position and from an open to closed position when said actuator is in engagement with said valve, wherein said device includes a housing in which the actuator is mounted for axial reciprocation between the positions of engagement and disengagement with the valve, including adjustable means for preventing said actuator from movement to the position of valve engagement wherein said adjustable means include apertured slides mounted in the housing and movable to a position wherein the slide apertures are in linear alignment in a plane normal to the axial movement of the actuator, including means external of the housing for manually adjusting the slides and for manually moving the actuator to the various positions, wherein said actuator is spring biased to the position of disengagement and wherein said adjustable means comprise a plurality of parallel coplanar slides movable transversely to the axis of the actuator and having apertures perpendicular to the slide movement, said slides being selectively movable to position wherein said apertures are in coplanar linear alignment perpendicular to the axis of the actuator, said actuator including a transverse projection adapted to pass through said apertures when aligned whereby said actuator can move to a position clearing the slides for an engagement with said valve, each of said slides being movable to other positions obstructing axial movement of said actuator by abutting the said transverse projection.

2. A fuel lock as in claim 1 wherein the slides are arranged symmetrically about the actuator and said external means are external knobs spaced from and movable parallel to a calibrated housing surface.

* * * * *